United States Patent [19]
Kent

[11] 3,956,846
[45] May 18, 1976

[54] COLLAPSIBLE FISHING

[76] Inventor: James Eldon Kent, 1828 S. Main, Wichita, Kans. 67213

[22] Filed: Feb. 10, 1975

[21] Appl. No.: 529,946

[52] U.S. Cl. ............................ 43/21.2; 248/538
[51] Int. Cl.² ........................................ A01K 97/10
[58] Field of Search ............... 43/21.2; 248/42, 46, 248/156

[56] References Cited
UNITED STATES PATENTS

| | | | |
|---|---|---|---|
| 2,934,298 | 4/1960 | Aleskin | 43/21.2 |
| 3,835,568 | 9/1974 | Whitfield | 43/21.2 |

*Primary Examiner*—Warner H. Camp
*Attorney, Agent, or Firm*—Robert E. Breidenthal

[57] ABSTRACT

A rod holder construction comprising a U-shaped support formed by bending a steel rod to form a web and eyes at the junctures of the web with legs that have free ground penetrating ends, together with a U-shaped holder formed by bending a steel rod to form a cradle-like web that joins a pair of parallel legs that slidably extend through the eyes of the support. The free end portions of the holder legs are divergent to oppose removal of the legs. The construction is collapsible to parallelly superpose the holder on the support, and can be extended for use with the holder inclined upwardly from the support so that a rod can rest on the cradle-like web and bear upwardly against the underside of the support web.

10 Claims, 7 Drawing Figures

U.S. Patent May 18, 1976 Sheet 2 of 2 3,956,846
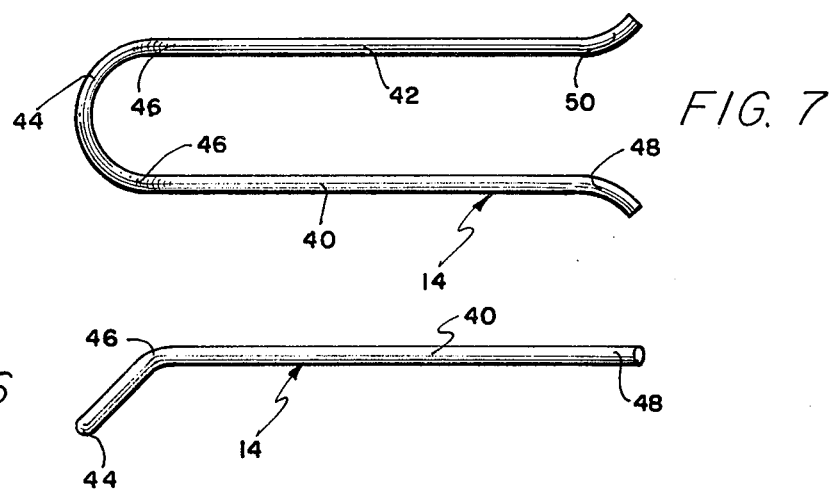
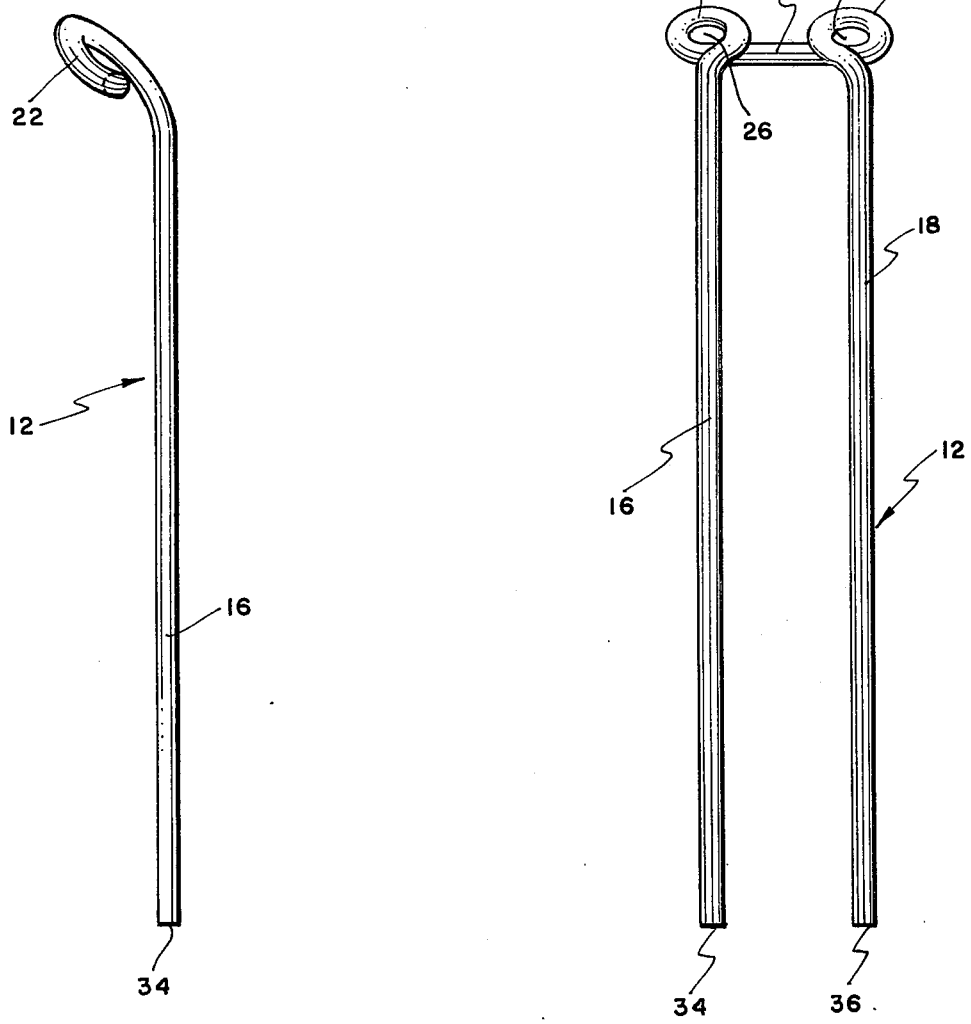

COLLAPSIBLE FISHING

The subject invention relates to new and useful improvements in fishing rod holders, and more particularly pertains to a device of such type that can be collapsed to compact condition that can be easily stored in a conventional tackle box.

An appreciation of the general character of objectives sought to be attained by the present invention as well as an understanding of the background art can be obtained on consideration of the following listed U.S. Pat. Nos.

| | | |
|---|---|---|
| 2,512,151 | Harrison | June 20, 1950 |
| 2,592,306 | Maze | April 8, 1952 |
| 2,202,730 | Kilby | May 28, 1940 |
| 2,059,921 | Weiss | November 3, 1936 |
| 2,487,094 | Brown | November 8, 1949 |
| 2,888,220 | Rose | May 26, 1959 |
| 3,835,568 | Whitfield | September 17, 1974 |
| 2,934,298 | Aleskin | April 26, 1960 |

Broadly the invention involves a fishing rod holder construction comprising a generally U-shaped support and a generally U-shaped rod holder, said support comprising a pair of elongated and parallelly spaced support legs that are joined by a web extending therebetween, said support being provided with a pair of spaced openings therethrough that are dispsosed adjacent the junctures of the web with the support legs, said rod holder comprising a pair of generally parallel holder legs that are joined by a holder web, said holder legs having a spacing about the same as that of said pair of openings, said holder legs slidably extending through said pair of openings in an arrangement such that the holder web can be moved from a retracted position relatively adjacent the support web through a range of intermediate positions to an extended position relatively remote therefrom, and said holder legs and said openings being so constructed and arranged so that the holder legs can be oscillated from substantial parallelism with the support legs for an angularly limited extent to a rod holding position.

The invention and the practice thereof will be best understood in the light of the following description of a preferred embodiment thereof, such description being given in conjunction with the accompanying drawings, wherein:

FIG. 4 is an enlarged side elevation of the support component of the device, with the transverse configuration of the center thereof being shown in dashed outline;

FIG. 5 is a rear elevational view of the support component; and,

FIGS. 6 and 7 are respectively side and top views of the holder component of the device.

Figure 1:
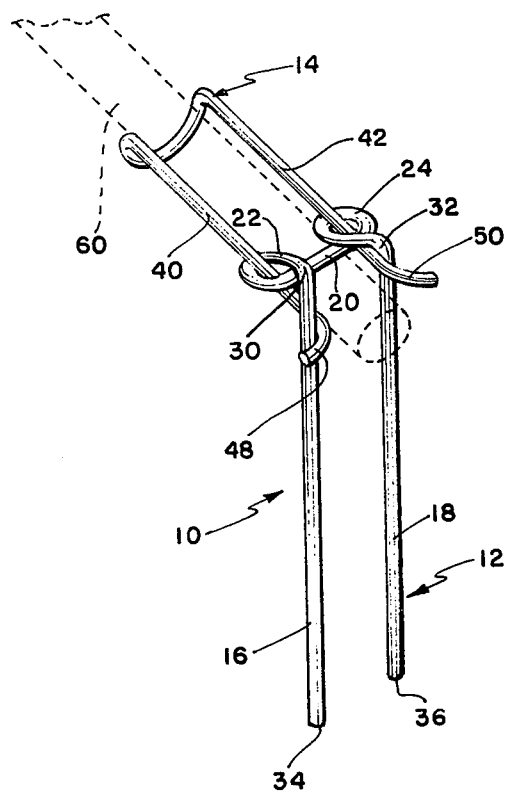
FIG. 1 is an isometric view of the device fully extended for use with a portion of a fishing rod supported thereon being shown in dashed outline.
Figure 2:
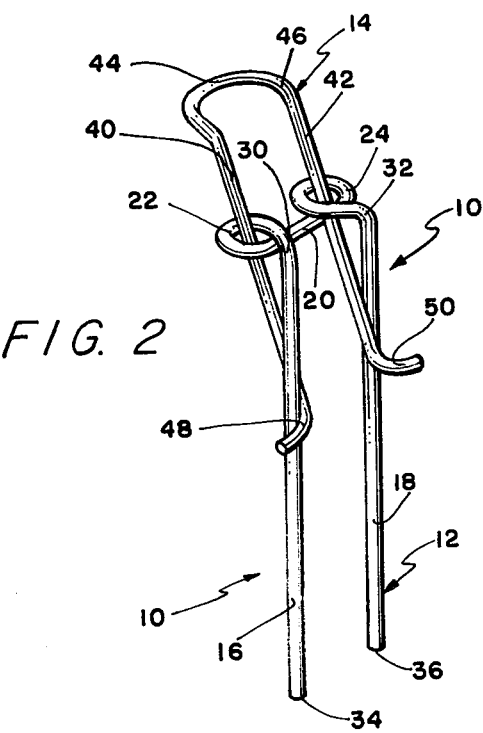
FIGS. 2 and 3 are isometric views respectively showing the device at an intermediate condition of extension and fully collapsed into compact storage condition.

Referring now to the drawings wherein like numerals designate like parts throughout the various views, the reference numeral 10 designates the fishing rod holder device or construction generally, the same being comprised of a U-shaped support component designated generally at 12 and of a U-shaped holder component designated generally at 14.

The components 12 and 14 are each formed by bending of suitable round steel stock and are preferably respectively of ¼ inch and 3/16 inch diameter. Preferably also the overall length of the steel stock from which the holder component 12 is formed is conveniently about double the overall length of the steel stock from which the holder component 14 is formed.

The support component is comprised of a pair of parallelly spaced straight legs 16 and 18 that are joined by an arched web 20 with the portions of the steel stock forming the junctures of the web 20 with the legs being convoluted as shown to form eyes 22 and 24 respectively defining guide openings 26 and 28. It will be noted that the axes of the convolutions constituting the eyes 22 and 24 are inclined at acute angles to a plane defined by the support legs 16 and 18 by reason of bends 30 and 32 adjacent the eyes 22 and 24.

The ends 34 and 36 of the support legs 16 and 18 are suited for ground penetration in use.

The support 12 has a plane of symmetry intermediate the legs and normal to the center of the support web 20.

The holder 14 comprises a pair of parallel legs 40 and 42 having a spacing so as to be slidably received through the openings 26 and 28, such legs being joined by an arcuate web portion 44. The web portion is bent at its junctures 46 with the legs 40 and 42 as shown so that the same is concave toward a plane defined by the legs 40 and 42. The arrangement is such that the holder web 44 constitutes a cradle-like structure.

Figure 3:
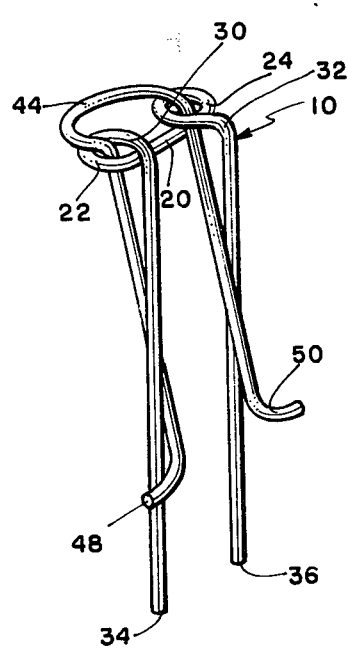

The legs 40 and 42 are bent adjacent their free ends at 50 and 48 so as to be divergent to oppose the legs 40 and 42 from being freely withdrawn from the openings 26 and 28 and so as to seat against the legs 16 and 18 when the device 10 is in its collapsed condition shown in FIG. 3.

The holder 14 has a plane of symmetry that coincides with the plane of symmetry of the support 12.

The inclination of the eyes 22 and 24 are such with respect to the plane of the legs 16 and 18, that the holder legs 40 and 42 can be oscillated from parallelism with the support legs to an upwardly inclined angle such as shown in FIG. 1 (the legs 16 and 18 being considered as vertical) wherein the eyes 22 and 24 coact with the legs 40 and 42 to limit further oscillation or angular movement of the holder. In this regard, it will be noted that the openings 26 and 28 are somewhat larger than the diameter of the legs 40 and 42. The extent of the bends 30 and 32 coupled with the relative size of the openings 26 and 28 and the legs 40 and 42 determine the angular inclination of the holder 14 relative to the support 12 when the former is in its holding position as will be quite apparent to those skilled in the art.

The forming of the components 12 and 14 by bending is straight forward and can easily be performed to produce a durable and reliable device. It is usually more convenient to form the bends 48 and 50 after all other bending has been completed and after the legs 40 and 42 have been extending through the openings 26 and 28.

The use of the device will be readily understood. The holder 14 is telescopingly extensible from the support 12, and can at any degree of extent from its collapsed position shown in FIG. 3 be oscillated to its angularly limited position. The support legs 16 and 18 can be forced to penetrate the ground at any convenient time.

A fishing rod such as partially indicated in dashed outline at 60 can be disposed to both rest upon the holder web 44 and to bear upwardly against the support web 20 in an arangement such that the fishing rod 60 has an inclination approximating that of the holder 14. The telescopic extensibility of the holder 14 affords some degree of accommodation for the size and location of the reel, not shown, on the rod.

Since the foregoing will amply suffice for a complete understanding of the principles of the invention, its manufacture and the enjoyment of its use, further description is unwarranted, and attention is now directed to the appended claims.

I claim:

1. A fishing rod holder construction comprising a generally U-shaped support and a generally U-shaped rod holder, said support comprising a pair of elongated and parallelly spaced support legs that are joined by a web extending therebetween, said support being provided with a pair of spaced openings therethrough that are disposed adjacent the junctures of the web with the support legs, said rod holder comprising a pair of generally parallel holder legs that are joined by a holder web, said holder legs having a spacing about the same as that of said pair of openings, said holder legs slidably extending through said pair of openings in an arrangement such that the holder web can be moved from a retracted position relatively adjacent the support web through a range of intermediate positions to an extended position relatively remote therefrom, and said holder legs and said openings being so constructed and arranged so that the holder legs can be oscillated from substantial parallelism with the support legs for an angularly limited extent to a rod holding position.

2. The combination of claim 1, wherein the holder web is of arcuate configuration and presents a concave surface facing toward a plane defined by the holder legs, with said concave surface facing in a direction opposite the direction of its movement when the holder is oscillated toward its rod holding position.

3. The combination of claim 1, wherein said holder legs are provided with means remote from the holder web for opposing inadvertent removal thereof from said openings.

4. The combination of claim 3, wherein said holder is comprised of a single length of material having a substantially constant transverse configuration throughout its length.

5. The combination of claim 1, wherein said holder is comprised of a single length of material having a substantially constant transverse configuration throughout its length, and said holder legs being bent at positions spaced from the holder web with the ends thereof remote from the holder web having a spacing differing from that of the pair of openings, whereby removal of the holder legs from the pair of openings is opposed.

6. The combination of claim 5, wherein said holder legs are divergent from where they are bent to said ends thereof.

7. The combination of claim 1, wherein said support is comprised of a single length of material having a substantially constant transverse configuration throughout its length.

8. The combination of claim 7, wherein said pair of openings are defined by the length of material being convoluted at spaced positions to form eyes, with said convolutions being about generally parallel axes that are inclined to a plane defined by the support legs at acute angles, and said support having a plane of symmetry intermediate the legs and normal to the center of the support web.

9. The combination of claim 8, wherein the holder is also comprised of a length of material of substantially constant transverse configuration throughout its length, and has a plane of symmetry coincident with the plane of symmetry of the holder.

10. The combination of claim 9, wherein the transverse configurations of the support and the holder are both circular, with the former having a greater diameter than the latter.

* * * * *